United States Patent [19]

Radobenko

[11] 3,813,022

[45] May 28, 1974

[54] WIRE BONDER APPARATUS

[75] Inventor: William Radobenko, Scottsdale, Ariz.

[73] Assignee: Automated Equipment Corporation, Phoenix, Ariz.

[22] Filed: June 19, 1972

[21] Appl. No.: 264,354

[52] U.S. Cl. .................. 228/3, 29/470.1, 29/576, 29/628, 228/4, 228/5

[51] Int. Cl. .................. B23k 21/00

[58] Field of Search .......... 73/71.6, 67.2; 228/3, 4, 228/5, 6, 44; 29/470.1, 576, 580, 628

[56] References Cited

UNITED STATES PATENTS

| | | | |
|---|---|---|---|
| 3,125,906 | 3/1964 | Johnson | 228/4 |
| 3,543,988 | 12/1970 | Kalicke, Jr. | 228/1 X |
| 3,566,678 | 3/1971 | Christmann | 73/67.2 |
| 3,601,304 | 8/1971 | Mansour | 228/1 |
| 3,700,156 | 10/1972 | Hermanns | 228/3 X |

*Primary Examiner*—J. Spencer Overholser
*Assistant Examiner*—Robert J. Craig

[57] ABSTRACT

A wire bonder apparatus for bonding a wire to an electrical element at a plurality of bonding points and looping the wire between the points is provided with a bonding tool, which is mounted on an X-Y stage movable in an X-Y coordinate system. This X-Y stage comprises a compound reed assembly including a top frame supported on a first pair of flexible reeds, the first pair of reeds being supported on a second pair of flexible reeds hung from a base support, and a mounting platform mounted on a third pair of flexible reeds, the third pair of reeds being supported on a fourth pair of flexible reeds hung from the top frame. A bonding tool support arm is mounted on the mounting platform, a swing block being mounted on the end of the support arm by a fifth pair of flexible reeds, the bonding tool being mounted on the swing block by a sixth pair of flexible reeds, and means being provided for moving the bonding tool up and down on the swing block. A sub-base assembly supports the electrical element to which the wire is to be bonded, the sub-base assembly being movably supported, and a micromanipulator assembly being coupled to the sub-base assembly for moving it to initially position the electrical element under the bonding tool.

31 Claims, 12 Drawing Figures

WIRE BONDER APPARATUS

BACKGROUND OF THE INVENTION

In present day transistor manufacturing technology, a transistor die is bonded to a base member in a transistor, frame or header, a metallic terminal member extending out from the base member of the frame serving as an electrical terminal for electrical connection to the die. The transistor frame is provided with two additional metallic terminal members extending from the proximity of the base member. During manufacture of the transistor, electrical connections must be made between these two additional electrical terminal members and two associated connecting pads on the die. These last-mentioned electrical connections are made with thin wire, such as one mil gold wire, by an operator manipulating a wire bonding machine over the transistor assembly.

A wire bonding tool is positioned over a first one of the pads on the die, and the bonding tool and the associated wire fed to the tool from a spool are brought down to bond the end of the wire to the first pad. The bonding tool is then lifted from the first pad and moved to an associated first terminal member where the next bonding connection with the wire is to be made, the wire being fed through the bonding tool and looped over the distance between the bonding point on the first pad and a new bonding point on the first terminal member. The bonding tool and the wire are then brought down to form a first bond to the first terminal member, and thereafter the bonding tool and wire are raised from that bonding point, moved a short distance, and then brought down again onto the first terminal member to form an additional loop and a second bond of the wire to the first terminal member. These two bonds to the first terminal member with the wire stitched in between result in a higher reliability electrical contact.

The wire is then broken or cut to free the wire and permit the bonding tool to be returned over the second pad on the transistor die where the next bond is then made by lowering the bonding tool and wire. Thereafter, the bonding tool is moved and the wire fed out in a loop fashion over to the associated second terminal member to which the next electrical connection is made by a double stitch bond similar to that described for the first terminal member. The wire is then cut or broken, and the next transistor unit and associated transistor die moved into position to make the desired two electrical connections for this second transistor die. These wire bonding machines require a great deal of manual manipulation by the operator in moving the bonding tool and wire from bonding point to bonding point. This is a relatively slow process and is very tiring on the operator.

SUMMARY OF THE INVENTION

In the present invention a wire bonding apparatus is provided, which, once initially positioned over the first bonding pad on the die, will thereafter automatically bond a one mil gold wire to the first pad, move and loop the wire in a direct path to the next bonding point on the associated first terminal member where a second wire bond is made followed by a stitch and additional wire bond to the same terminal member. The apparatus then operates automatically to break the wire and return to a position over the second bonding pad on the transistor die where the next wire bond is made followed by movement of the bonding tool and looping of the wire to the associated second terminal member where an additional stitch bond is made.

Since these movements between all six bonding points and the bonding and breaking of the wire are all done automatically, the process may be performed very fast and with little effort on the part of the operator once the initial alignment with the first bonding pad has been made. Where the transistor units are automatically fed in an indexed manner to the wire bonding apparatus, a great many transistor dice may be bonded without additional manipulation on the part of the operator. In one wire bonding machine made in accordance with this invention, ten thousand seperate bonds may be made in one hour.

In one embodiment of the invention a novel floating X-Y stage is utilized to carry the wire bonding mechanism over the bonding area so that the mechanism may be moved in a coordinate system from bonding point to bonding point. The X-Y stage comprises a top frame mounted on a first pair of thin, flexible, flat reeds, the top frame being mounted at two opposite sides on the upper edges of these two reeds with the reeds extending vertically downward from the top frame. Each of these two reeds is mounted via an associated reed spacer at its bottom edge to the bottom edge of an associated thin, flexible, flat reed of a second pair of reeds, the reeds being spaced apart and mutually parallel. The reeds of the second pair are mounted at their upper edges on a fixed base structure such that the complete flexible reed structure hangs from the base structure with the top frame being able to move or float on the reed structure in a direction perpendicular to the parallel faces of the reeds. The X-Y stage further comprises a second flexible reed structure similar to the first flexible reed structure described above. The second flexible reed structure comprises a mounting platform mounted on the upper edges of two flexible reeds. These reeds are in turn mounted via spacers at their lower edges to the lower edges of two associated reeds, the associated reeds in turn being hung from their upper edges within the internal region of the top frame. The reeds in this second reed structure are positioned normal to the reeds in the first reed structure such that the mounting platform may float or move within the top frame in a direction perpendicular to the direction of floating movement of the top frame. Thus, the mounting platform may be moved in a first direction by movement of the top frame on the first reed structure and may be moved in a second direction normal to the first direction by movement of the mounting platform within the top frame on the second reed structure.

The X-Y stage is moved under control of a cam assembly including an X cam for controlling the X movement of the stage and a Y cam for controlling the Y movement of the stage. In addition, there is a loop cam which serves to control the movement of the wire bonding tool over the bonding areas. This loop cam insures that the wire bonding tool will be lowered onto a bonding area to produce a wire bond and will be raised therefrom to carry the wire in a looping manner over to the next and succeeding bonding areas. A wire clamping mechanism is employed to clamp the wire after the last bond in a particular electrical connection so that, when the wire bonding tool is raised, the wire will break and will leave a slight tail extending from the wire bonding tool to be utilized in creating the first bond of the next electrical connection.

DESCRIPTION OF THE PREFERRED EMBODIMENT

Figure 1:
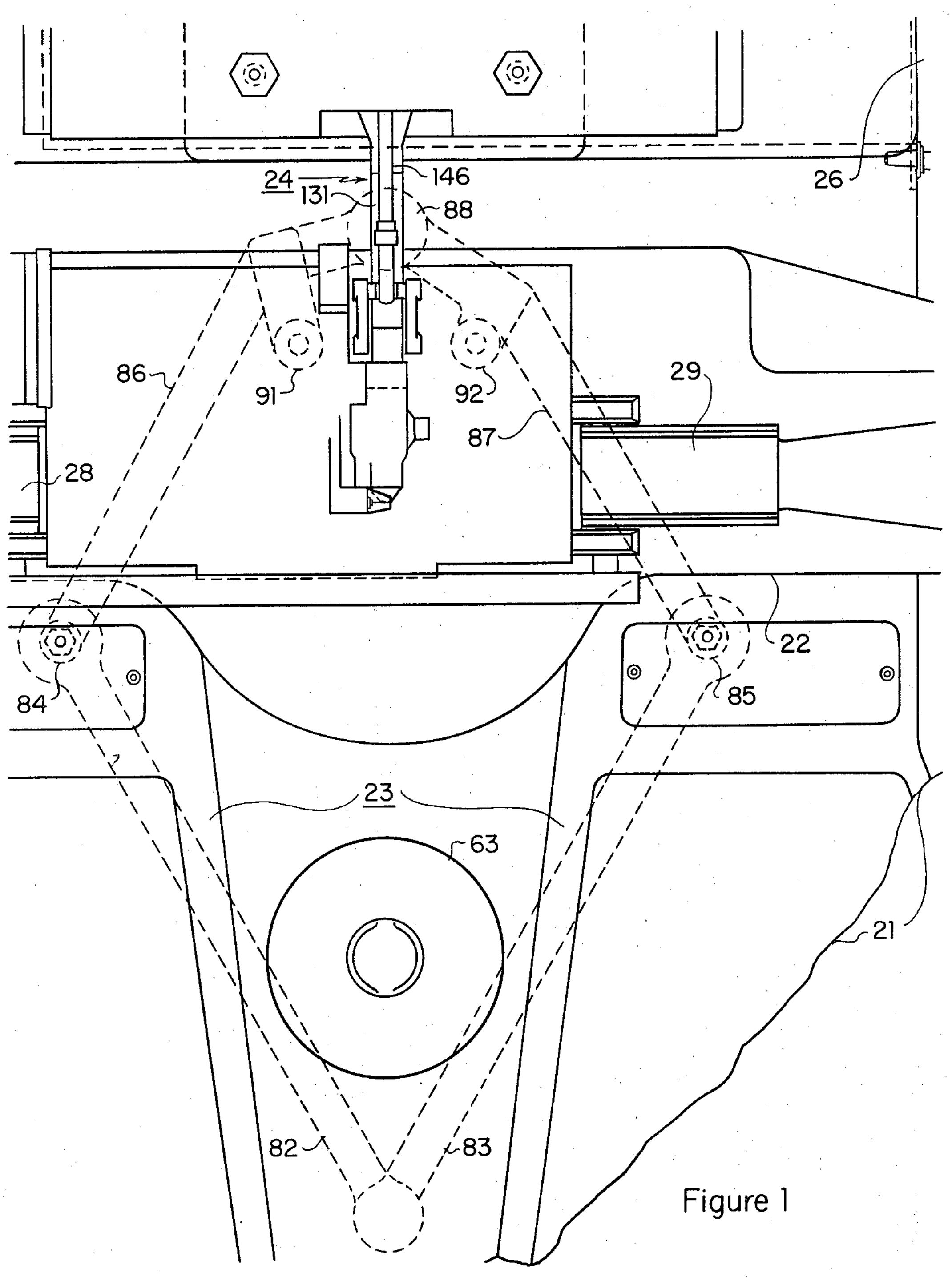
FIG. 1 is a top view of wire bonder apparatus according to the preferred embodiment of this invention.
Figures 2, 3:
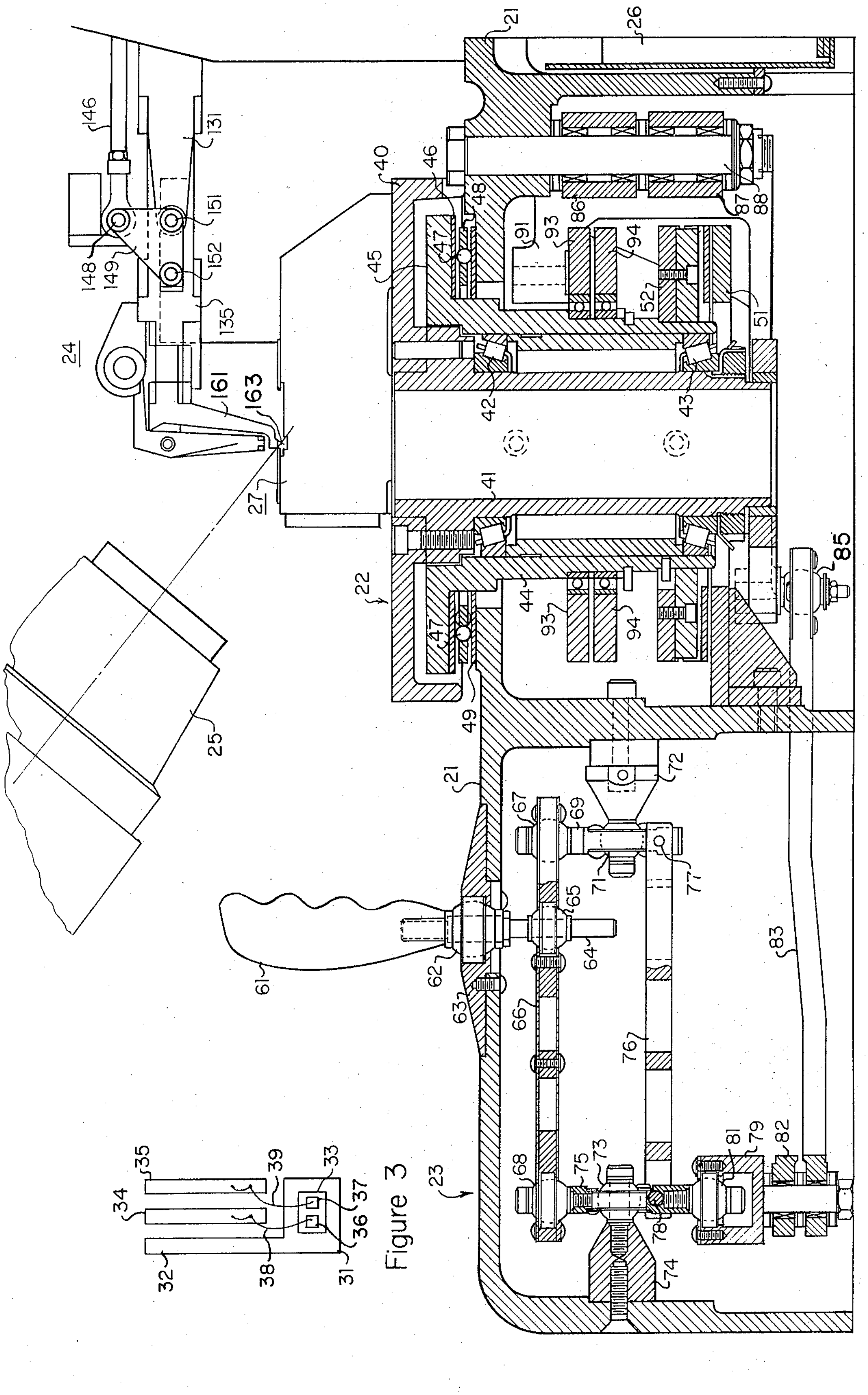
FIG. 2 is a side view of the wire bonder apparatus of FIG. 1 with the micromanipulator and sub-base assembly shown in cross-section.
FIG. 3 is a top view of a typical transistor unit to which wire bonds are to be made.

Referring now to FIGS. 1 and 2, the wire bonder apparatus comprises a housing a main base structure 21 of which carries thereon a swivel sub-base assembly 22, a micromanipulator mechanism 23 for moving the sub-base assembly, a wire bonder tool holder mechanism 24, the operator's microscope 25, and an electronic logic control compartment 26. The swivel sub-base assembly 22 supports thereon a transistor strip indexing mechanism 27 including a transistor strip heater unit and left and right-hand transistor strip magazine holders 28 and 29, respectively.

The operator first places a transistor strip magazine (not shown) holding ten transistor strips in stacked relationship therein on the left-hand transistor strip magazine holder 28 and places an empty transistor strip magazine (not shown) on the right-hand transistor strip magazine holder 29. The first transistor strip is fed by the operator onto the transistor strip indexing mechanism 27, which is similar to that shown in United States Pat. No. 3,695,501 issued on Oct. 3, 1972, and entitled Die Bonder Apparatus. Reference is made to this prior application for a detailed showing of the transistor strip magazines and the indexing mechanism. The operator operates the indexing mechanism to bring the die of the first transistor unit on the multi-unit first transistor strip under a capillary wire bonding tip 163 held by a bonding tool holder 161, the swivel sub-base assembly 22 being operated by the micromanipulator mechanism 23 under control of the operator to bring the first bonding pad of the die directly under the capillary wire bonding tip 63 preparatory for the first wire bond.

The micromanipulator mechanism 23 comprises a handle 61 mounted on a spherical bearing 62 in a bearing bracket 63 secured to the upper portion of the main base structure 21, the handle 61 being provided with a joy stick slide pin 64 at its underside. The slide pin 64 extends through a central cylindrical opening or bore in a spherical bearing 65 carried in an upper link 66 also provided with a pair of spherical bearings 67 and 68 at its two ends. The inner end of the upper link 66 is coupled via a coupling link 69 and a spherical bearing 71 to a fixed anchor or pivot mounting member 72 secured to the main base structure 21. The other end of the upper link 66 is also coupled via another coupling link 75 and a spherical bearing 73 to another fixed anchor or pivot mounting member 74 secured to the main base structure 21. The lower ends of the two coupling links 69 and 75 are coupled together via a manipulator yoke member 76 and associated pivot pins 77 and 78, respectively. The lower end of the outer coupling link 75 is coupled to a pantograph pivot 79 having a pair of off-set manipulator links or arms 82 and 83 rotatably positioned on a pivot shaft.

The opposite ends of the two manipulator arms 82 and 83, which form a portion of a pantograph, carry spherical bearings 84 and 85 including shaft portions rotatably coupled to the ends of a left manipulator link 86 and an offset right manipulator link 87, respectively. The two manipulator links 86 and 87 are rotatably mounted on a shaft 88 secured in the main base structure 21, extension arms 91 and 92 of the two manipulator links 86 and 87, respectively, being pivotally secured to a pair of associated manipulator rings 93 and 94, respectively, encircling a hollow cylindrical main spindle 44 and rotatably mounted thereon.

A single typical transistor unit of the type carried on the multi-unit transistor strip is illustrated in FIG. 3. It includes a base member 31 having a transistor die 33 bonded thereto, a terminal member 32 extending out from the base member, and two separate terminal members 34 and 35. The die 33 has two bonding pads 36 and 37 thereon. A first wire connection 38 is to be made between the bonding pad 36 and terminal member 34, and a second wire connection 39 is to be made between bonding pad 37 and terminal member 35. One bond is to be made at each bonding pad 36 and 37 and two stitch bonds at each terminal member 34 and 35.

The swivel sub-base assembly 22 includes a sub-base plate 40 mounted on a manipulator main shaft 41 which is mounted via two spaced-apart bearings 42 and 43 in the hollow cylindrical main spindle 44. An annular flange 45 is provided at the upper end of main spindle 44. The lower surface of flange 45 is provided with an annular spindle ring 46 resting upon a plurality of ball bearings 47 held in a ball retainer plate 48, the ball bearings in turn resting upon an annular base ring 49 mounted on the upper surface of the main base structure 21. The spindle mechanism is provided with a pair of X and Y-axis antirotation ring members 51 and 52 which operate to inhibit rotational movement of the main spindle 44 on the main base structure 21 while permitting limited movement of the main spindle 44 and associated sub-base plate 40 in the X and Y direction on the main base structure 21 under control of the micromanipulator mechanism 23.

Manipulation of the joy stick handle 61 by the operator in any direction about its pivot bearing 62 results in a follower type operation by the two manipulator links 86 and 87 about the shaft 88, moving the main spindle 44 via manipulator rings 93 and 94. This results in an X-Y positioning movement of the sub-base plate 40 in the swivel sub-base assembly and a positioning of the associated transistor strip indexing mechanism 27 under the capillary wire bonding tip 163 as viewed through the microscope 25 by the operator. Thus, the movable sub-base assembly 22 follows the operator's movement of the joy stick and permits the positioning of the the heater unit which carries the transistor strip, such that the first bonding pad 36 on the first die of the first transistor unit on the transistor strip may be aligned directly under the capillary wire bonding tip 163 the bonding tool holder 161. Once the first bonding pad on the first die has been properly positioned under the wire bonding tool by the micromanipulator, the operator initiates operation of the wire bonding unit which then proceeds automatically to produce the desired wire bonds between bonding pads 36 and 37 and terminal members 34 and 35, respectively, of the fist transistor unit.

This wire bonder machine automatically indexes each transistor unit on the transistor strip in sequence under the capillary wire bonding tip 163 where two wires are bonded, the transistor strip automatically moving from the left-hand magazine in stepwise fashion across the heater unit and into the right-hand magazine. After completion of the wire bonds to each of the transistor units on the first transistor strip, the operator feeds the second transistor strip from the left-hand magazine onto the heater unit where the automatic wire bonds are made to each transistor unit in succession.

Figure 4:
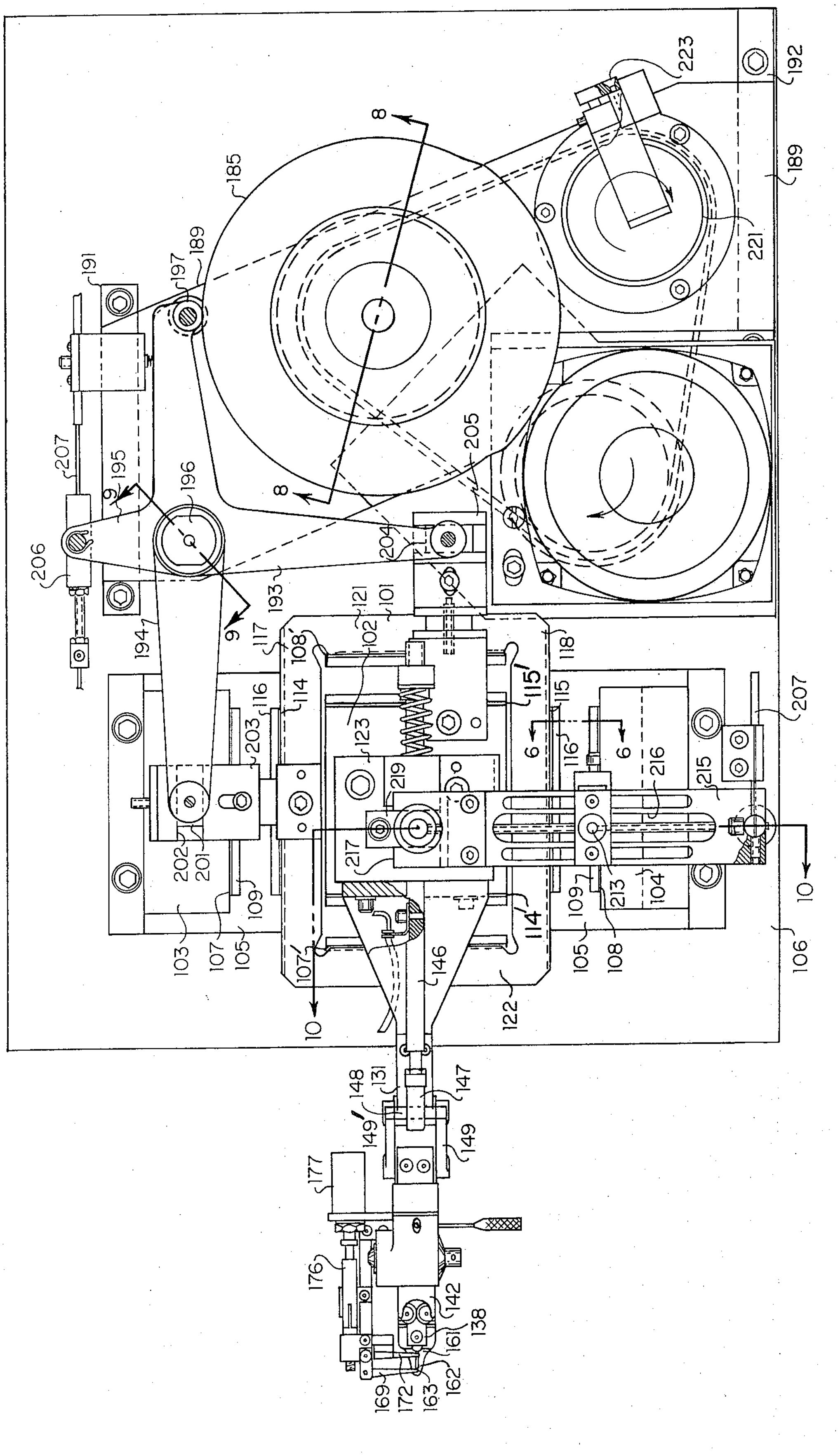
FIG. 4 is a plan view of the X-Y stage, the drive mechanism employed in the wire bonder apparatus of FIGS. 1 and 2 therefor, and the wire bonder tool mechanism.
Figure 5:
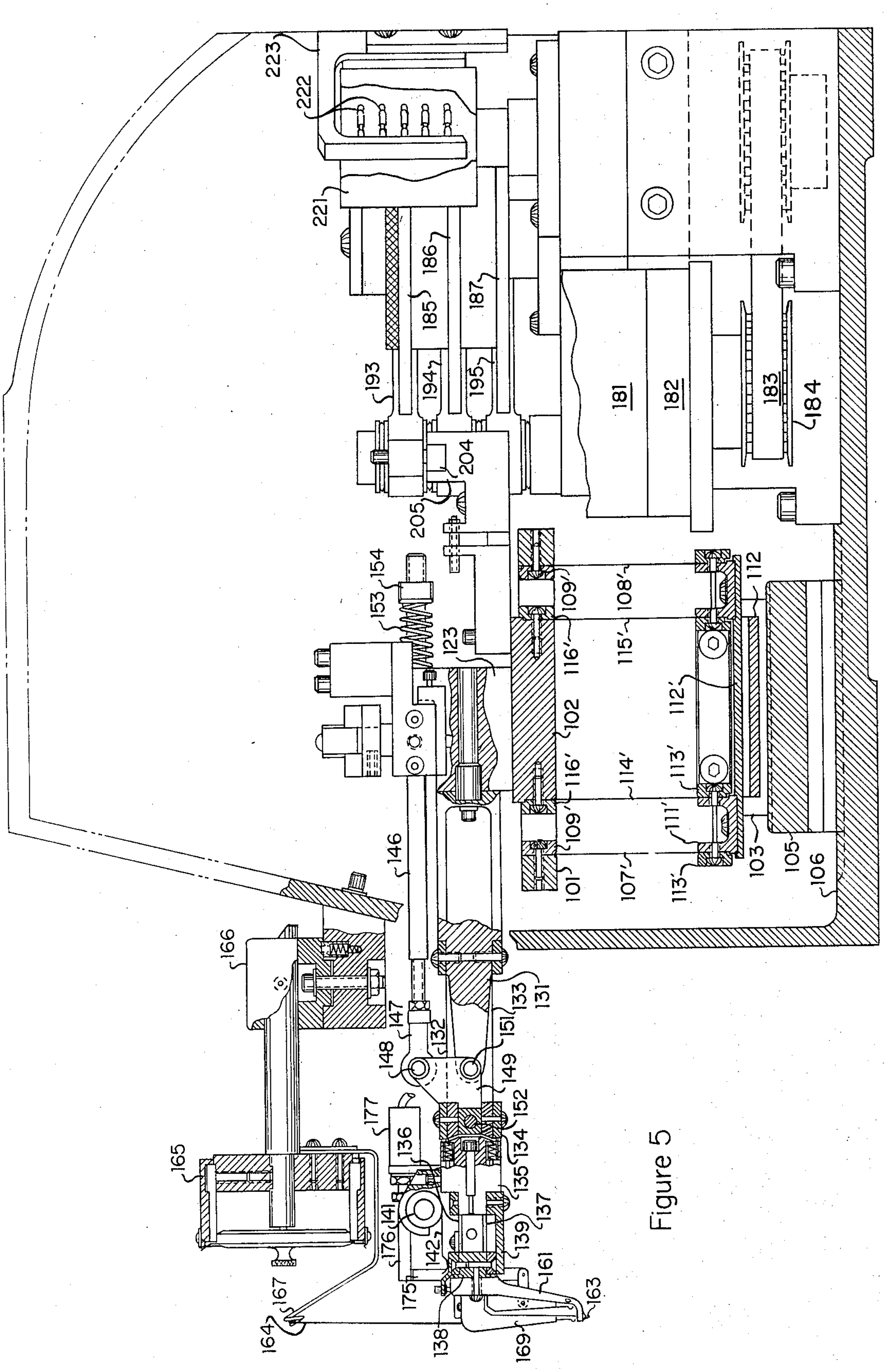
FIG. 5 is a side view partly in cross section of the apparatus of FIG. 4.

Referring to FIGS. 4 and 5, the wire bonder tool holder mechanism 24 includes a novel X-Y stage comprising a compound reed assembly, a first reed structure of this assembly serving to support a rectangular top frame 101 from a fixed base support structure and a second reed structure of this assembly being supported within the top frame 101 and carrying a ram mounting plate 102 thereon. Since these two reed structures are very similar in construction, the reference numerals used for the reed support members of the first reed structure will also be used for the reed support members of the second reed structure, the latter reference numerals being primed.

Figure 6:
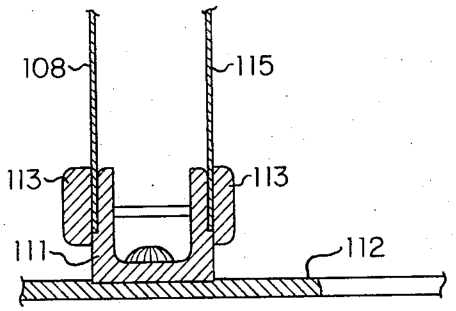
FIG. 6 is a cross-sectional view of a portion of one of the reed structures employed in the X-Y stage as taken along section line 6—6 in FIG. 4.

The X-Y stage further comprises a pair of reed hangers 103 and 104 fixedly secured in spaced-apart fashion on an X-Y stage support 105 which is in turn fixedly mounted on the floor 106 of the main base structure or chassis 21. Two wide, flat, thin flexible outer reeds 107 and 108 are mounted at their upper edge portions to the reed hangers 103 and 104, respectively, by reed caps 109, the reeds 107 and 108 hanving down from the associated reed hangers and carrrying of their lower edge portions two associated reed spacers 111. These two reed spacers 111 are fixedly secured together by means of a spacer separator member 112 and reed caps 113 (see FIG. 6). Two similar inner reeds 114 and 115 are affixed at their lower edge portions to the two associated reed spacers 111, the reeds 114 and 115 extending upwardly from the reed spacers 111 and being fixedly secured at their upper edge portions by reed caps 116 to the outer surfaces of two opposite sides 117 and 118, respectively, of the top frame 101. By a flexing of the two pairs of reeds 107, 114 and 108, 115 the top frame 101 may float or move in a direction normal to the faces of the reeds, i.e., in the X direction.

Two wide flat, thin, flexible outer reeds 107′ and 108′ are hung at their upper edge portions from the inner surfaces of the other two opposite sides 121 and 122 of the top frame 101. The lower edge portions of these two reeds 107′ and 108′ carry two reed spacers 111′ and a spacer separator member 112′. Two similar reeds 114′ and 115′ extend upwardly from the two spacers 111′ and carry at their upper edge portions the mounting plate 102 on which is mounted a ram mounting block 123. The mounting plate 102 and, hence, the ram mounting block 123 float on this second reed structure and may move in a direction within the top frame 101 normal to the direction of movement of the top frame 101 on the first reed structure, i.e. in the Y direction. Thus, the compound reed assembly provides for floating movement of the ram mounting block 123 in an X-Y coordinate system in any direction depending on the relative movements of the top frame 101 on the first reed structure and the mounting plate 102 on the second reed structure within the top frame 101.

A ram or bonding tool support arm 131 is fixedly secured to the front side of the ram mounting block 123 and extends outwardly through an opening in the front wall of the main housing. A first pair of thin, flexible, parallel, spaced-apart reeds 132 and 133 is fixedly secured at one end to the ram and is fixedly secured at the other end by means of a reed bracket 134 to a holder swing block 135. A second pair of thin, flexible, parallel, spaced apart reeds 136 and 137 is fixedly secured at one end to the holder swing block 135 and extend forwardly therefrom and into fixed engagement at the other end with a bonding tool holder fork 138.

A capillary reed block member 139 extending from the holder swing block 135 serves to limit the downward extent of travel of the tool holder fork 138 on the ends of the two reeds 136 and 137. By a flexing of the two reeds 136 and 137 the tool holder fork 138 may move upwardly from the capillary reed block member 139. A spiral spring assembly 141 mounted on the holder swing block 135 exerts a yieldable force at the outer end of the spring 142 onto the tool holder fork 138, normally urging it to a rest position against the capillary reed block member 139.

A push rod 146 is movably mounted on the ram mounting block 123, as described below, and extends out over the top of the ram 131, the end 147 of the push rod 146 terminating in a first pivot pin 148 of a bell crank assembly 149. The bell crank is pivotally secured by a second pivot pin 151 to the end of the am 131 and ia also pivotally fixed to the holder swing block 135 via a third pivot pin 152. A spring 153 captivated by a tension adjusting screw 154 on the end of the push rod 146 urges the push rod 146 to a longitudinal position which holds the tool holder fork 138 at a normal horizontal level.

A bonding tool holder 161 is fixedly secured on the outer end of the tool holder fork 138, the tool holder 161 extending in a generally downward direction to a tip portion 162 which carries a small, cylindrical, vertically-extending capillary 163 through which the wire to be bonded is fed vertically downward onto the bonding area. The bonding wire 164 is carried on a wire spool mechanism 165 rotatably mounted by a suitable bracket mechanism 166 on the front surface of the wire bonder housing, the wire being fed off of the rotatable spool, through a wire guide 167, and vertically downward through the small capillary 163 in the tip 162 of the bonding tool holder 161.

Figure 7:
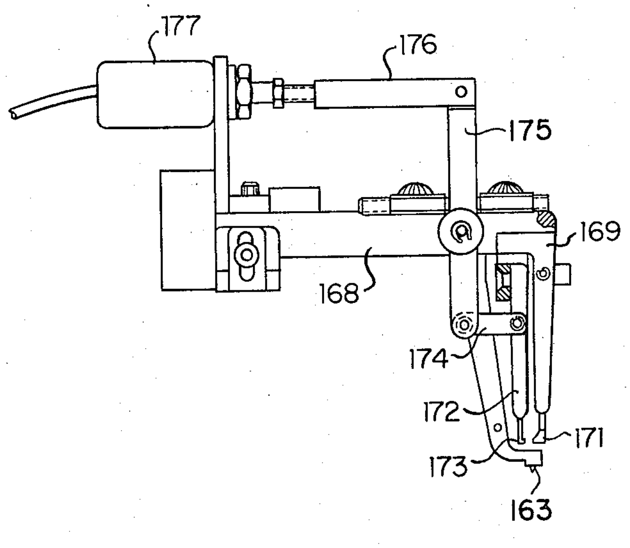
FIG. 7 is a side view of the wire holder assembly of the wire bonder tool mechanism looking from the side opposite that shown in FIG. 5 and illustrating more clearly the wire clamping mechanism.

A wire clamping mechanism (see FIG. 7) is fixedly secured on the holder swing block 135. This mechanism comprises a horizontally extending wire clamp member 168 having affixed to the outer end thereof a stationary wire clamp member 169 extending downwardly and terminating in a clamp tip 171 positioned just above the capillary 163 in the bonding tool holder. A flexing wire clamp member 172 is hung by a reed mounting from the under side of the wire clamp member 168, the flexing wire clamp member terminating in a clamping tip 173 designed to engage the clamp tip 171 of the stationary wire clamp member 169 to fixedly clamp the wire just above the capillary 163. The flexing wire clamp member 172 is pivotally affixed to a connecting arm 174, the outer end of the connecting arm 174 being pivotally affixed to the end of a rod lever arm 175 which is pivotally mounted on the stationary wire clamp member 168. The upper end of the rod lever arm 175 is pivotally secured to a solenoid rod 176 which is operated in a push-pull fashion by an electrical solenoid 177. The solenoid, when operated, moves the clamping tip 173 of the flexing wire clamp member 172 into engagement with the mating stationary clamp tip 171 to clamp the wire, the deenergization of the solenoid relaxing the flexing wire clamp member 172 and permitting freedom of movement of the wire through the capillary 163.

Figure 8:
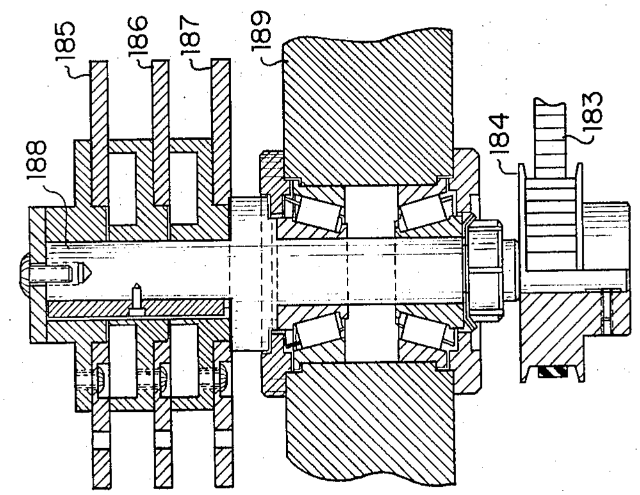
FIG. 8 is a cross-sectional view of the cam assembly of the drive mechanism as taken along section line 8—8 in FIG. 4.

The drive mechanism for the X-Y stage and the bonding tool holder comprises a main drive motor 181 mounted on a motor riser block 182 on the floor 106 of the main base structure 21. A timing belt 183 and sprocket 184 driven by the main motor 181 drives a Y-axis cam 185, an X axis cam 186, and a loop cam 187. These cams are fixedly secured on a main shaft 188 rotatably mounted in a bearing block 189 carried by two end support members 191 and 192 on the main base structure 21 of the wire bonder housing (see FIG. 8 ).

Figure 9:
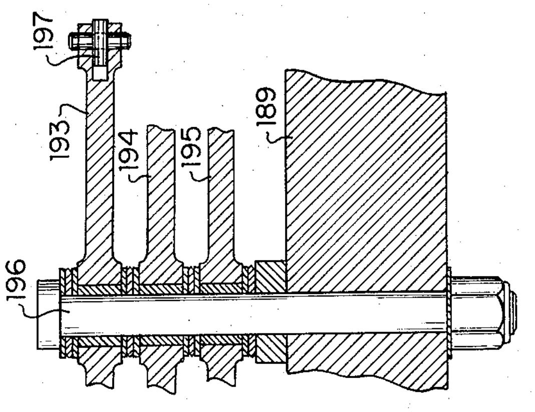
FIG. 9 is a cross-sectional view of the cam arm assembly of the drive mechanism as taken along section line 9—9 in FIG. 4.

A Y cam arm 193, an X cam arm 194, and a loop cam arm 195 are rotatably mounted on a pivot pin 196 secured in the main bearing block 189 (see FIG. 9 ). One end of each of these cam arms terminates in a separate rotatable bearing 197 which engages the edge surface of the associated cam 185, 186 or 187, the cam arms pivoting about the pivot pin 196 in response to variations in the edge surface of the associated cam.

The other end of the X cam arm 194 carries a pivotally mounted slide member 201, the slide member fitting within a slide way 202 in an X position guide 203 fixedly secured to the top frame member 101. Pivoting motion of the X cam arm 194 about the pivot pin 196 in response to variations in the edge surface of the X axis cam 186 results in a tracking movement of the X position guide 203 with a resulting to-and-fro movement of the top frame 101 in the X direction.

The other end of the Y cam arm 193 also carries a pivotally mounted slide member 204 slidably positioned within a Y position guide 205 fixedly secured to the mounting plate 102. In response to variations in the edge surface of the Y-axis cam 185, the Y cam arm 193 serves to move the mounting plate 102 and, hence, the ram mounting block 123 within the top frame 101 in the Y direction normal to the X-direction movement of the top frame 101.

Figure 10:
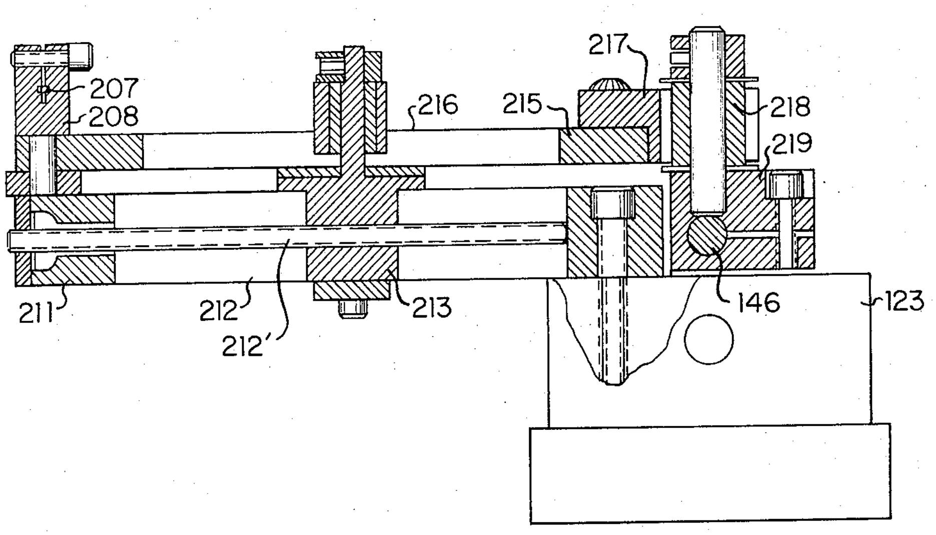
FIG. 10 is a cross-sectional view of a push-rod control assembly for the wire bonder tool mechanism as taken along section line 10—10 in FIG. 4.

The outer end of the loop cam arm 195 is coupled via a swivel assembly 206 to one end of a metallic flexible cable 207 which extends in a U fashion around the rear portion of the wire bonder housing and is coupled at its opposite end to a cable clamp 208 mounted on a push rod control assembly (see FIG. 10). This control assembly comprises an elongated adjustment bracket 211 affixed at its inner end to the ram mounting block 123, the outer end of the adjustment bracket 211 extending off to the side of the compound reed assembly.

The adjustment bracket 211 is provided with an elongated opening 212 in the center portion thereof and a center screw rod 212', a position pivot pin 213 being movably mounted within the longitudinal opening 212 on the screw rod 212' and being provided with a clamp mechanism by which the pivot pin 213 can be fixedly secured in the adjustment bracket at a selected position along it length. An elongated adjustable slide member 215 having an elongated slot 216 therein is pivotally mounted on the adjustable pivot pin 213 and pivots about this pin at the particular position at which the pin is clamped. The inner end of the adjustable slide member 215 carries a slide fork 217 fixedly secured thereto, a clamp slide 218 being positioned wihin the slide fork 217 and carrying thereon a rod clamp member 219 which serves to carry the push rod 146. The cable clamp 207 is mounted on the external end of the adjustable slide member 215.

Movement of the flexible metallic cable 207 in response to movement of the loop cam arm 195 results in a pivoting movement of the adjustable slide member 215 about the pivot pin 213 resulting in a to-and-fro movement of the push rod 146 in the Y direction on the ram mounting block 123. The top end of the bell crank 149 pivots around the pivot pin 151 in the end of the ram 131 resulting in a flexure of the two reed members 132 and 133 and a vertical movement of the wire bonder tool on the end of the ram.

In addition to driving the cams, the motor 181 drives a cylindrical timing drum 221 which has a plurality of optical sources 222 therein and a plurality of photodetectors (not shown) aligned with the optical sources and positioned externally of the timing drum in a housing 223. Horizontal slots in the timing drum positioned between the individual light sources 222 and the associated photodetectors serve to establish optoelectronic circuit connections between the light sources and the photodetectors. As the motor 181 rotates to rotate the three cams 185–187, the timing drum 221 also rotates, making and breaking various optoelectronic circuit connections during specified segments of each complete revolution of the three cams.

Figure 11:
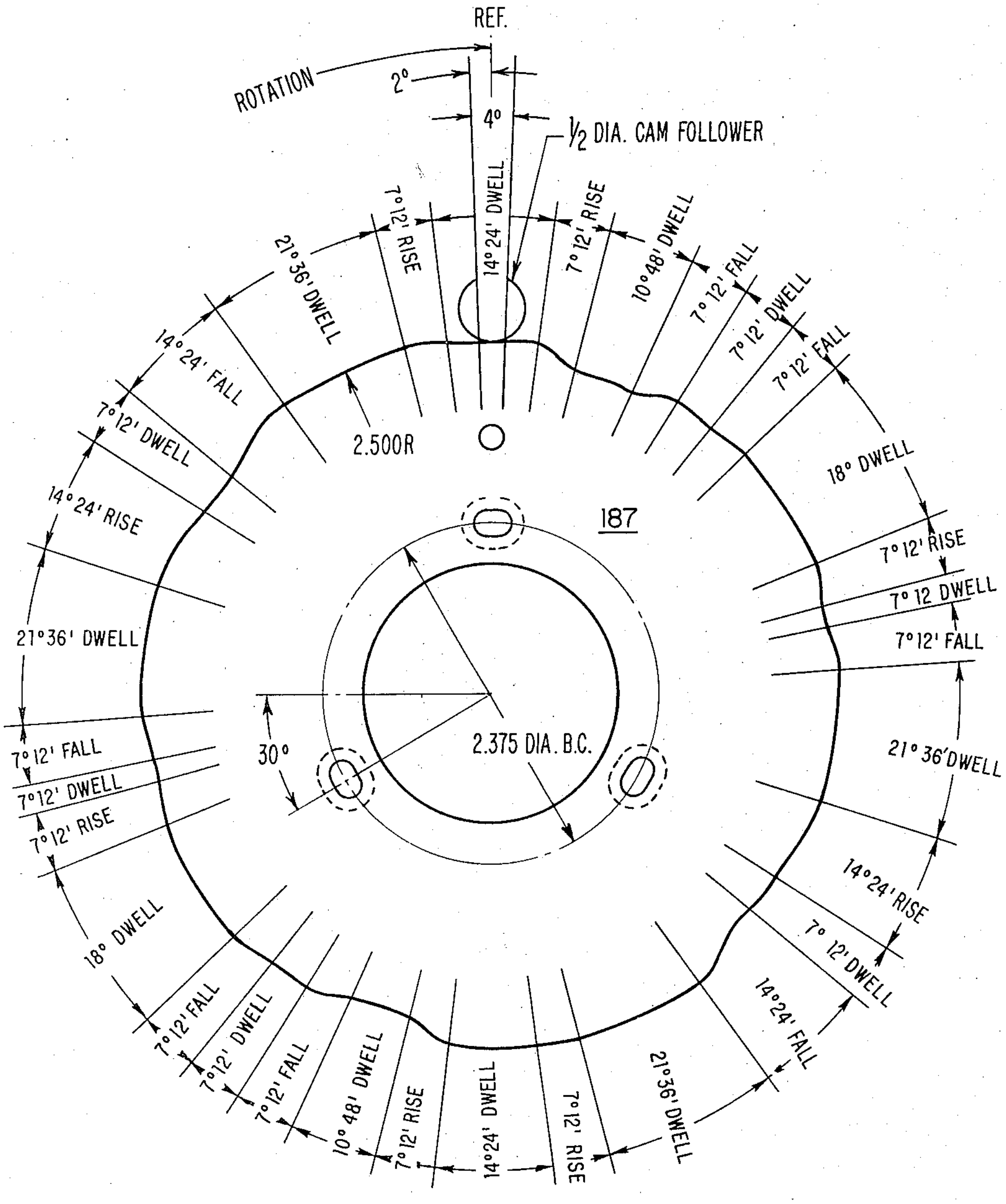
FIGS. 11 and 12 are a plan view of and a timing diagram for a typical form of loop cam utilized in the wire bonder apparatus of FIGS. 1, 2, and 4–10.
Figure 12:
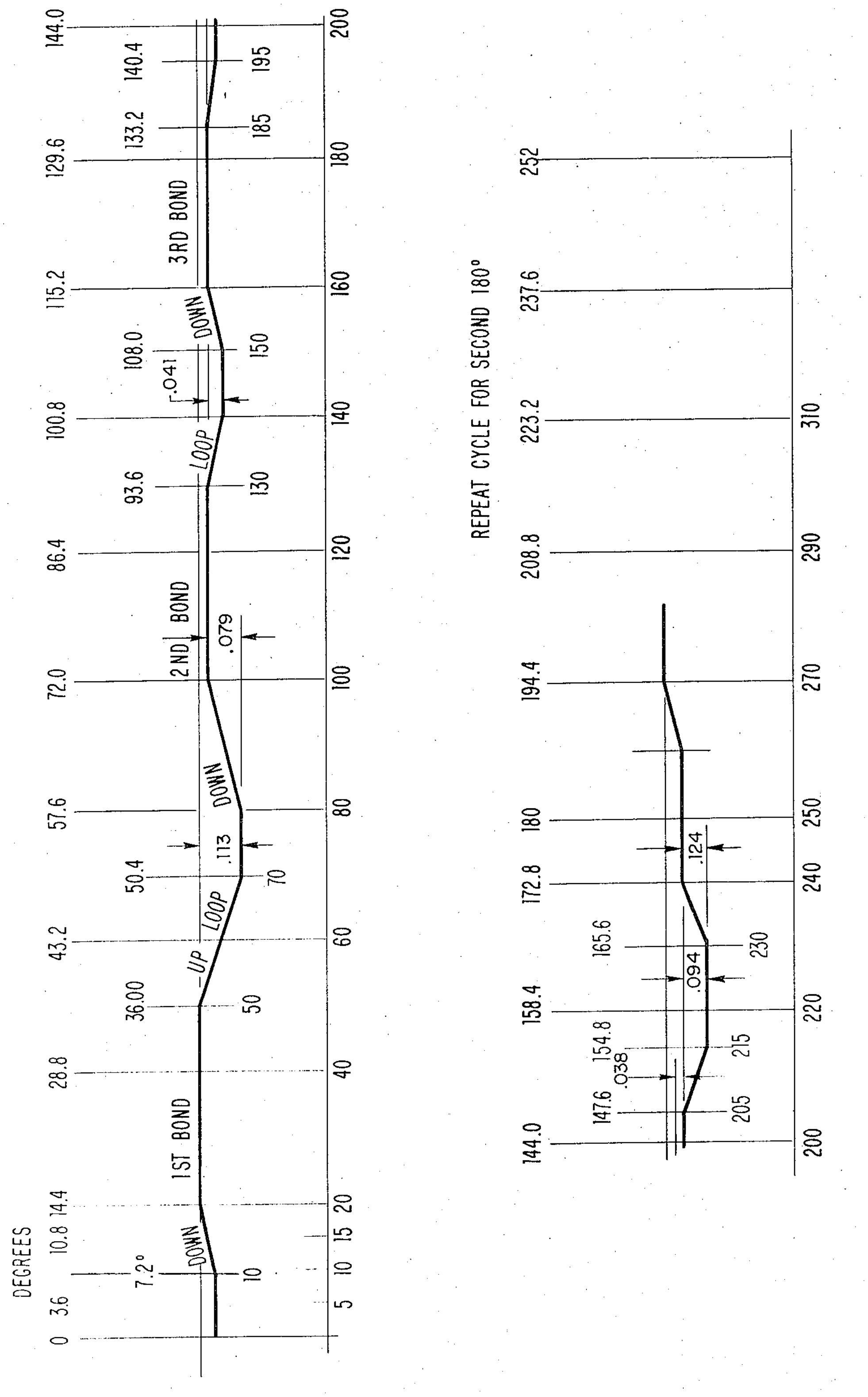

A typical form of loop cam 187 is shown in FIG. 11. The timing diagram for this cam is shown in FIG. 12. As can be seen in the timing diagram, there are three bonding periods within the first 180° rotation of the loop cam, with wire looping periods between the first and second bonds and the second and third bonds. After the third bond there is a period during which the X and Y axis cams and the X-Y stage are operating to move the wire bonding tool from the last bond on the terminal member 34 to a position just above the second bonding pad 37 on the die 33. During the second 180° rotation of the loop cam there are an additional three bonding periods where a wire bond is made to the bonding pad 37 and stitch bonds to the terminal member 35, wire looping periods occurring between the first and second bonds and between second and third bonds. After the third bond in the second 180° rotation of the loop cam, there is a dwell period during which time the X-Y stage operates to move the wire bonding tool back to a position over the first bonding pad 36. During this dwell period the machine is indexing so that the next transistor unit in the series is moved into place under the wire bonding tool.

The X and Y axis cams are specifically designed for the purpose of operating the X-Y stage compound reed assembly via the associated X and Y cam arms to move the ram mounting block 123 and thus the wire bonding tool over the bonding areas to which the bonds are to be made. The cam surfaces are especially designed to provide the exact direction and distance of movement called for by the particular transistor units being bonded by the machine as well as the needed dwell times for bonding. In this particular illustration, the first bond is made to the transistor unit at the bonding pad 36 (shown in FIG. 3) during a first dwell period. The X-Y stage then moves the wire bonding tool over the external terminal member 34 where the first bond to this terminal member is made, followed by a short movement of the X-Y stage and wire bonding tool to the second bonding point on this terminal member. The timing drum assembly functions at this time to close an optoelectronic circuit to the wire clamping solenoid 177 which operates to clamp the bonding wire between clamp tip 171 and clamping tip 173 just above the capillary 163. Thus, as the bonding tool holder is raised away from the second bond on the terminal member 34 by the push rod 146, the bonding wire is pulled and is broken, leaving a short tail portion extending below the capillary 163. This tail portion then serves as the wire portion to be bonded to the second bonding pad 37 on the die 33 when the bonding tool has been properly positioned over this bonding pad by movement of the compound reed assembly. During the second half of the revolution of the X and Y axis cams, the wire bonding tool is moved from the bonding pad 37 after a bond is made thereto and is successively positioned over two bonding points on the external terminal member 35 where the stitch bonding is accomplished. After the last bond on the external terminal member 35, the wire clamping mechanism again operates to clamp the wire so that it is broken as the bonding tool holder leaves the external terminal member 35 to return to the dwell position over the first bonding pad 36. The complete cycle is then repeated to produce the necessary wire bonding on the next transistor unit indexed into place.

The indexing of each transistor unit into the proper position under the wire bonding tool is initiated by the timing drum and associated optoelectronic circuit. The form of indexing mechanism which may be utilized is shown and described in the above-cited patent and reference is made thereto for a detailed description of the transistor unit indexing.

I claim:

1. Apparatus for transporting an object over a predetermined path, said apparatus comprising:

a base;

a first flexible reed assembly mounted on said base;

a top frame mounted on said first reed assembly, said first reed assembly being capable of flexing to permit movement of said top frame in a first direction on said base;

a second flexible reed assembly mounted on said top frame;

a mounting platform mounted on said second reed assembly to hold the object to be transported, said second reed assembly being capable of flexing to permit movement of said mounting platform on said top frame in a second direction normal to said first direction; and drive means for moving said mounting platform on said top frame by flexing said second reed assembly and for moving said top frame on said base by flexing said first reed assembly.

2. Apparatus as in claim 1 wherein said drive means comprises:

first and second cam followers coupled to said top frame and said mounting platform, respectively;

first and second cams coupled to said first and second cam followers, respectively, for moving said first and second cam followers to move said top frame and said mounting platform, respectively; and motor means for driving said first and second cams.

3. Apparatus as in claim 2 including:

movable means movably mounted on said mounting platform;

a third cam follower coupled to said movable means; and a third cam coupled to said third cam follower for moving said third cam follower said movable means relative to said mounting platform, said motor means also being operable for driving said third cam.

4. Apparatus as in claim 3 wherein:

the object to be transported comprises a bonding tool coupled to said mounting platform, said bonding tool being positioned over a selected bonding location in response to movement of said mounting platform under control of said first and second cams; and said apparatus includes coupling means for coupling said bonding tool to said movable means on said mounting platform said coupling means being operable for raising and lowering said bonding tool to and from said bonding location in response to movement of said movable means.

5. Apparatus as in claim 4 including:

means for feeding a bonding wire to said bonding tool; and clamping means mounted on said bonding tool for at times clamping the bonding wire fed to said bonding tool.

6. Apparatus as in claim 4 wherein said movable means comprises a push rod mounted for lateral movement on said mounting platform, said coupling means coupling one end of said push rod to said bonding tool to convert to-and-fro lateral movement of said push rod into up-and-down vertical movement of said bonding tool.

7. Apparatus as in claim 1 wherein:

the object to be transported comprises a bonding tool coupled to said mounting platform, said mounting platform being movable on said first and second reed assemblies to a position said bonding tool over a selected bonding location;

said apparatus includes control means movably mounted on said mounting platform for raising and lowering said bonding tool to and from said bonding location; and said apparatus includes additional drive means for driving said control means.

8. Apparatus as in claim 7 wherein said control means comprises:

a swing block;

a first pair of flexible reeds coupling said swing block to a support arm mounted on said mounting platform; and a second pair of flexible reeds coupling said swing block to said bonding tool.

9. Apparatus as in claim 8 wherein said drive means comprises:

first and second cam followers coupled to said top frame and said mounting platform, respectively;

first and second cams coupled to said first and second cam followers, respectively, for moving said first and second cam followers to move said top frame and said mounting platform, respectively; and motor means for driving said first and second cams.

10. Apparatus as in claim 9 wherein:

said control means further comprises movable means movably mounted on said mounting platform;

said additional drive means comprises a third cam follower coupled to said movable means; and said additional drive means further comprises a third cam coupled to said third cam follower for moving said movable means relative to said mounting platform, said motor means also being operable for driving said third cam.

11. Apparatus as in claim 7 including:

a sub-base positioned under said bonding tool;

support means for movably supporting said sub-base; and and manipulator means coupled to said support means for moving said sub-base under said bonding tool.

12. Apparatus for transporting an object over a predetermined path, said apparatus comprising:

a base;

a first pair of spaced-apart, flexible reeds each mounted at one end to said base;

a second pair of spaced-apart, flexible reeds each mounted at one end to the other end of an associated different one of the reeds in said first pair of reeds;

a top frame mounted at two opposed sides on the other ends of the reeds in said second pair of reeds, said top frame extending between the reeds in said second pair of reeds;

a third pair of spaced-apart, flexible reeds each mounted at one end within said top frame to an associated different one of two other opposed sides of said top frame;

a fourth pair of spaced-apart, flexible reeds each mounted at one end to the other end of an associated one of the reeds in said third pair of reeds, said third and fourth pairs of reeds being oriented normal to said first and second pairs of reeds;

a mounting platform mounted on the other ends of the reeds in said fourth pair of reeds to hold the object to be transported;

first means coupled to said top frame for moving said top frame in a first direction by flexing said first and second pairs of reeds; and second means coupled to said mounting platform for moving said mounting platform on said top frame in a second direction normal to said first direction by flexing said third and fourth pairs of reeds.

13. Apparatus as in claim 12 wherein said first and second means comprise:

first and second cam followers, respectively; and first and second cams coupled to said first and second cam followers, respectively, for moving said first and second cam followers to move said top frame and said mounting platform, respectively; and motor means for driving said first and second cams.

14. Apparatus as in claim 13 including:

movable means movably mounted on said mounting platform;

a third cam follower coupled to said movable means; and a third cam coupled to said third cam follower for moving said movable means relative to said mounting platform.

15. Apparatus as in claim 14 wherein:

the object to be transported comprises a bonding tool mounted on said mounting platform, said bonding tool being positioned over a selected bonding location in response to movement of said mounting platform under control of said first and second cams; and said apparatus includes coupling means for coupling said bonding tool to said movable means on said mounting platform, said coupling means being operable for raising and lowering said bonding tool to and from said bonding location in response to movement of said movable means.

16. Apparatus as in claim 15 including:

means for feeding a bonding wire to said bonding tool; and clamping means mounted on said bonding tool for at times clamping the bonding wire fed to said bonding tool.

17. Apparatus as in claim 15 wherein said movable means comprises a push rod mounted for lateral movement on said mounting platofrm, said coupling means coupling one end of said push rod to said bonding tool to convert to-and-fro lateral movement of said push rod into up-and-down vertical movement of said bonding tool.

18. Apparatus as in claim 12 wherein:

the object to be transported comprises a bonding tool mounted on said mounting platform, said mounting platform being movable on said first, second, third, and fourth pairs of reeds to position said bonding tool over a bonding location;

said apparatus includes control means movably mounted on said mounting platform for raising and lowering said bonding tool to and from said bonding location; and said apparatus includes third means coupled to said control means for moving said control means.

19. Apparatus as in claim 18 wherein said control means comprises:

a swing block;
a first pair of flexible reeds coupling said swing block to a support arm mounted on said mounting platform; and
a second pair of flexible reeds coupling said swing block to said bonding tool.

20. Apparatus as in claim 19 wherein said first and second means comprise:
first and second cam followers, respectively;
first and second cams coupled to said first and second cam followers, respectively, for moving said first and second cam followers to move said top frame and said mounting platform, respectively; and
motor means for driving said first and second cams.

21. Apparatus as in claim 20 wherein:
said control means further comprises movable means movably mounted on said mounting platform;
said third means comprises a third cam follower coupled to said movable means; and
said third means further comprises a third cam coupled to said third cam follower for moving said movable means relative to said mounting platform, said motor means also being operable for driving said third cam.

22. Apparatus as in claim 18 including: a sub-base positioned under said bonding tool;
support means for movably supporting said sub-base; and
manipulator means coupled to said support means for moving said sub-base under said bonding tool.

23. Assembly tool apparatus comprising:
an X-Y stage;
first drive means for moving said X-Y stage in an X-Y coordinate system;
a support arm mounted on said X-Y stage;
a tool;
flexible mounting means for movably mounting said tool on said support arm;
control means coupled to said tool and movably mounted relative to said support arm for moving said tool along a path intersecting the plane of said X-Y coordinate system; and
second drive means coupled to said control means for moving said control means to move said tool along said path relative to said support arm.

24. Assembly tool apparatus as in claim 23 wherein said flexible mounting means comprises a pair of flexible reeds mounting said tool on said support arm.

25. Apparatus as in claim 23 wherein:
said first drive means comprises first and second cam followers coupled to said X-Y stage for driving it in an X direction and in a Y direction, respectively;
first and second cams coupled to said first and second cam followers, respectively, for moving said first and second cam followers to move said X-Y stage in said X direction and in said Y direction, respectively; and
motor means for driving said first and second cams.

26. Apparatus as in claim 25 wherein said second drive means comprises:
a third cam follower coupled to said control means; and
a third cam coupled to said third cam follower for moving said control means to move said tool along said path relative to said support arm.

27. Apparatus as in claim 26 wherein:
said tool is a bonding tool coupled to said support arm, said bonding tool being positioned over a bonding location in response to movement of said X-Y stage under control of said first and second cams; and
said control means is operable for raising and lowering said bonding tool to and from said bonding location.

28. Apparatus as in claim 27 including:
means for feeding a bonding wire to said bonding tool; and
clamping means mounted on said bonding tool for at times clamping the bonding wire fed to said bonding tool.

29. Apparatus as in claim 27 wherein said control means comprises:
a push rod mounted for lateral movement relative to said support arm; and
coupling means for coupling one end of said push rod to said bonding tool to convert to-and-fro lateral movement of said push rod into up-and-down vertical movement of said bonding tool along said path relative to said support arm.

30. Apparatus as in claim 23 wherein:
said tool is a bonding tool coupled to said support arm, said bonding tool being positioned over a bonding location in response to movement of said X-Y stage;
said control means is operable for raising and lowering said bonding tool to and from said bonding location along said path.

31. Assembly tool apparatus comprising:
an X-Y stage;
drive means for moving said X-Y stage in an X-Y coordinate system;
a support arm mounted on said X-Y stage;
a swing block;
a first pair of flexible reeds mounting said swing block on said support arm;
a tool;
a second pair of flexible reeds mounting said tool on said swing block; and
means coupled to said swing block and movably mounted relative to said support arm for moving said tool along a path intersecting the plane of said X-Y coordinate system.

* * * * *

UNITED STATES PATENT OFFICE
CERTIFICATE OF CORRECTION

Patent No. 3,813,022 Dated May 28, 1974

Inventor(s) William Radobenko

It is certified that error appears in the above-identified patent and that said Letters Patent are hereby corrected as shown below:

Column 1, line 6 delete the first comma;

Column 2, line 15, change "seperate" to --separate--;

Column 2, line 35, the sentence beginning on this line should start a new paragraph;

Column 4, line 3, change "63" to --163--;

Column 5, line 19, after "163" insert --held by--;

Column 5, line 26, change "fist" to --first--;

Column 5, line 59, change "hanving" to --hanging--;

Column 5, line 60, change "of" to --at--;

Column 6, line 7, after "wide" insert a comma;

Column 6, line 12, after "similar" insert --inner--;

Column 6, line 32, after "ram" insert --131--;

Column 6, line 55, change "am" to --ram--;

Column 6, line 56, change "ia" to --is--;

Column 7, line 40, between "X" and "axis" insert a hyphen;

Column 7, line 51, after "186" insert a comma;

Column 7, line 59, after "X" insert a hyphen;

UNITED STATES PATENT OFFICE
CERTIFICATE OF CORRECTION

Patent No. 3,813,022 Dated May 28, 1974

Inventor(s) William Radobenko Page - 2

It is certified that error appears in the above-identified patent and that said Letters Patent are hereby corrected as shown below:

Column 8, line 22, change "it" to --its--;

Column 8, line 64, between "Y" and "axis" insert a hyphen;

Column 9, line 5, after "between" insert --the--;

Column 9, line 6, change "1800" to --180°--;

Column 9, line 13, between "Y" and "axis" insert a hyphen;

Column 9, line 44, between "Y" and "axis" insert a hyphen;

Claim 3, line 7, after "follower" insert --to move--;

Claim 4, line 10, after "platform" insert a comma;

Claim 7, line 5, delete "a";

Claim 11, line 4,delete "and" (second occurrence); and

Claim 17, line 3, change "platofrm" to --platform--;

O-1050 (10-69)

USCOMM-DC 60376-P69
* U.S. GOVERNMENT PRINTING OFFICE : 1969 O—366-334

UNITED STATES PATENT OFFICE
CERTIFICATE OF CORRECTION

Patent No. 3,813,022 Dated May 28, 1974

Inventor(s) William Radobenko PAGE - 3

It is certified that error appears in the above-identified patent and that said Letters Patent are hereby corrected as shown below:

Column 3, lines 13-15, change "employed in the. . .tool mechanism" to --therefor , and the wire bonder tool mechanism employed in the wire bonder apparatus of FIGS. 1 and 2--;

Column 5, line 15, delete "the" (second occurrence);

Column 6, lines 36-37, change "extend" to --extends--;

Column 7, line 57, delete --member--; and

Column 8, line 31, change "207" to --208--.

Signed and sealed this 8th day of October 1974.

(SEAL)
Attest:

McCOY M. GIBSON JR.
Attesting Officer

C. MARSHALL DANN
Commissioner of Patents